United States Patent [19]
Hasegawa

[11] Patent Number: 5,784,101
[45] Date of Patent: Jul. 21, 1998

[54] IMAGE READING APPARATUS HAVING CHARGE TRANSFER MEANS BETWEEN THE PLURALITY OF LINES OF PHOTOELECTRIC CONVERSION MEANS

[75] Inventor: Shizuo Hasegawa, Urayasu, Japan

[73] Assignee: Canon Kabushiki Kaisha, Tokyo, Japan

[21] Appl. No.: 381,407

[22] Filed: Jan. 31, 1995

[30] Foreign Application Priority Data

Feb. 4, 1994 [JP] Japan .................. 6-012764

[51] Int. Cl.⁶ .................................................. H04N 3/14
[52] U.S. Cl. ...................... 348/282; 348/283; 348/316; 348/323
[58] Field of Search .................. 348/295, 311, 348/316, 265, 281, 282, 283, 322, 323, 324, 272; 358/483; 257/234, 231

[56] References Cited

U.S. PATENT DOCUMENTS

| | | | |
|---|---|---|---|
| 4,280,141 | 7/1981 | McCann et al. | 348/295 |
| 4,691,114 | 9/1987 | Hasegawa et al. | 250/578 |
| 4,694,316 | 9/1987 | Chabbal | 257/231 |
| 4,750,048 | 6/1988 | Satoh et al. | 358/528 |
| 5,241,377 | 8/1993 | Kaneda | 348/281 |
| 5,285,295 | 2/1994 | Kai et al. | 348/283 |
| 5,308,970 | 5/1994 | Pool | 348/312 |
| 5,340,977 | 8/1994 | Kojima et al. | 348/283 |
| 5,345,319 | 9/1994 | Yu | 358/483 |
| 5,361,145 | 11/1994 | Hasegawa | 358/514 |
| 5,438,364 | 8/1995 | Maesjima et al. | 348/266 |

FOREIGN PATENT DOCUMENTS 0388658  9/1990  European Pat. Off.

OTHER PUBLICATIONS

IEEE Transactions On Consumer Electronics, vol. 38, No. 3, Aug. 1992, New York (US), pp. 576–582, XP000311896 T.C. Hsieh et al.: "linear image sensor optimized for fast color scanning".

*Primary Examiner*—Wendy Garber
*Attorney, Agent, or Firm*—Fitzpatrick,Cella, Harper & Scinto

[57] ABSTRACT

A color linear image sensor is constituted by forming a plurality of linear image sensors on a single wafer, each linear image sensor including a photoelectric conversion unit for converting light from an object into an electrical signal, a plurality of charge transfer units for transferring the signal converted into the electrical signal by the photoelectric conversion unit to an output unit, and color filters which are formed on the photoelectric conversion unit to color-separate the light from the object. A plurality of lines of photoelectric conversion units are arranged in each linear image sensor. At least one charge transfer unit is arranged between the photoelectric conversion units to synthesize output signals from the plurality of lines of photoelectric conversion units and to transfer the output signals from the photoelectric conversion units to the next photoelectric conversion unit. An accumulation unit temporarily stores the output signals from the photoelectric conversion units. By changing the method of applying a drive pulse, the charge transfer unit and the accumulation unit transfer the output signals in both forward and backward directions.

16 Claims, 10 Drawing Sheets

SPECTRAL ENERGY DISTRIBUTION

IMAGE READING APPARATUS HAVING CHARGE TRANSFER MEANS BETWEEN THE PLURALITY OF LINES OF PHOTOELECTRIC CONVERSION MEANS

BACKGROUND OF THE INVENTION

1. Field of the Invention

The present invention relates to an image reading apparatus for reading an image by a color image sensor and converting the image into an electrical signal.

2. Related Background Art

As a full-color reading system in a conventional apparatus of this type, ① light source switching system, ② prism separation system, ③ color filter switching system, or ④ on-chip color filter system is used. Of these systems, ④ on-chip color filter system is considered to be optimal because of its high reading speed and color separation precision.

Figures 1, 1A:
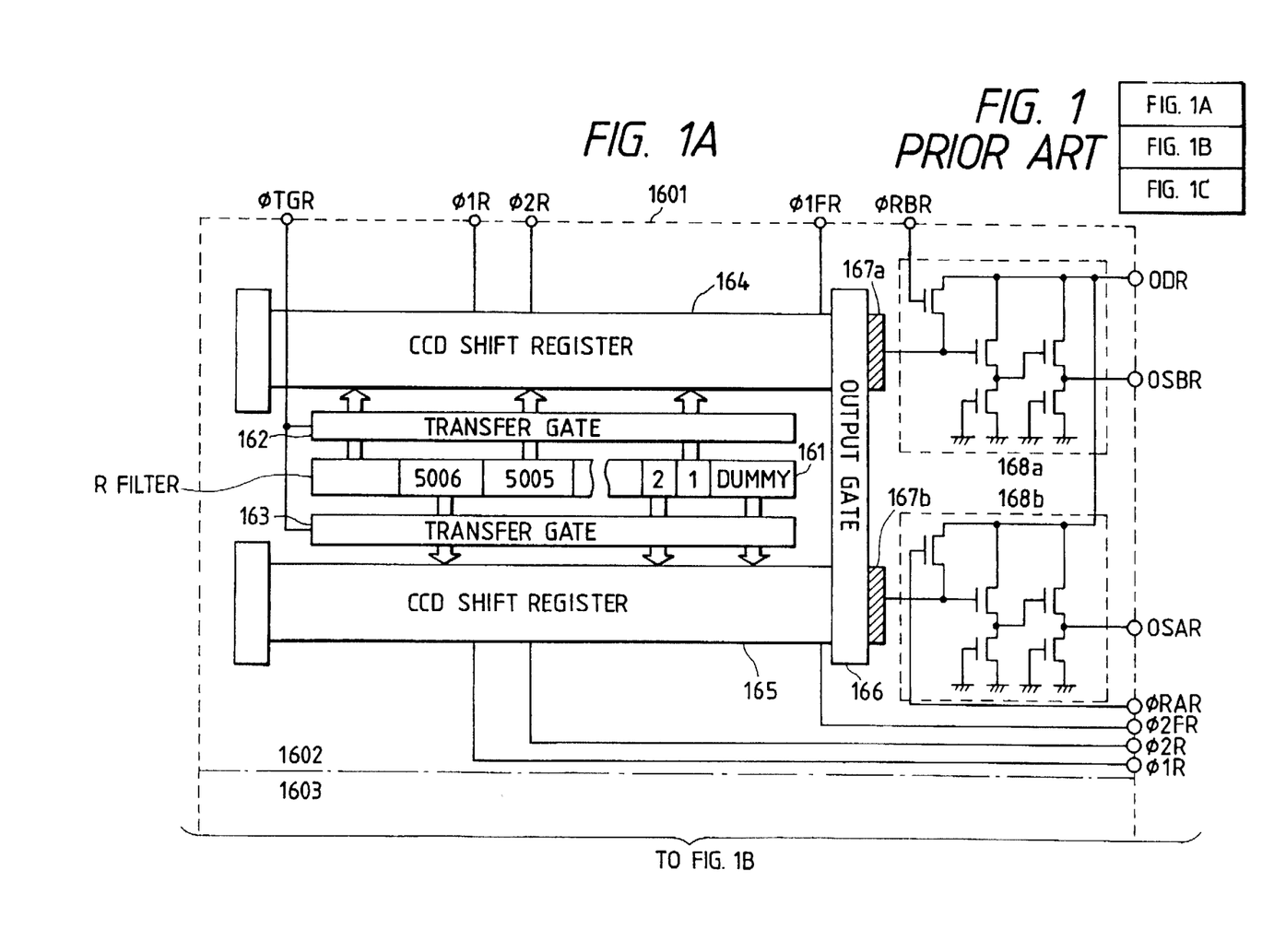
Figure 1B:
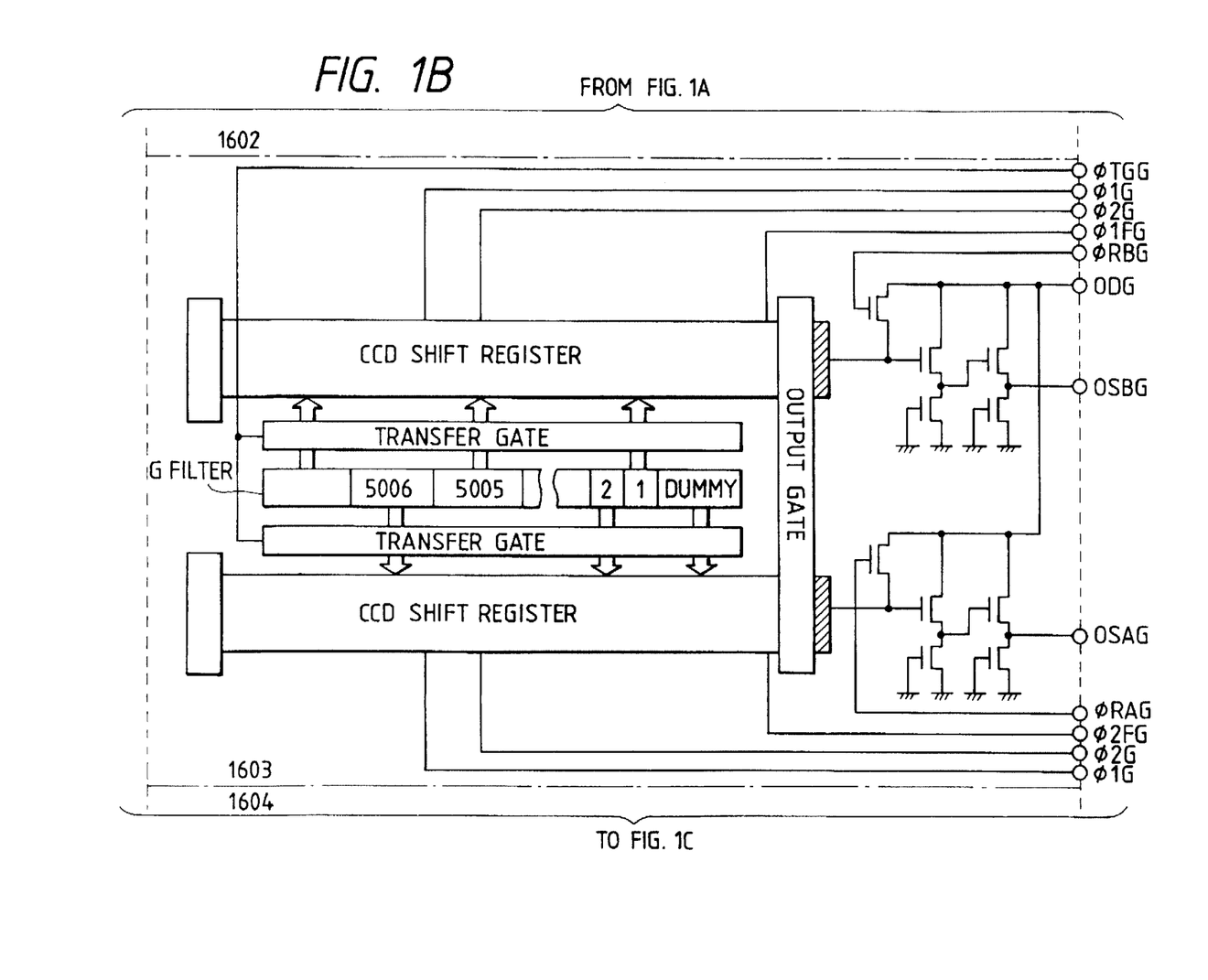
Figure 1C:
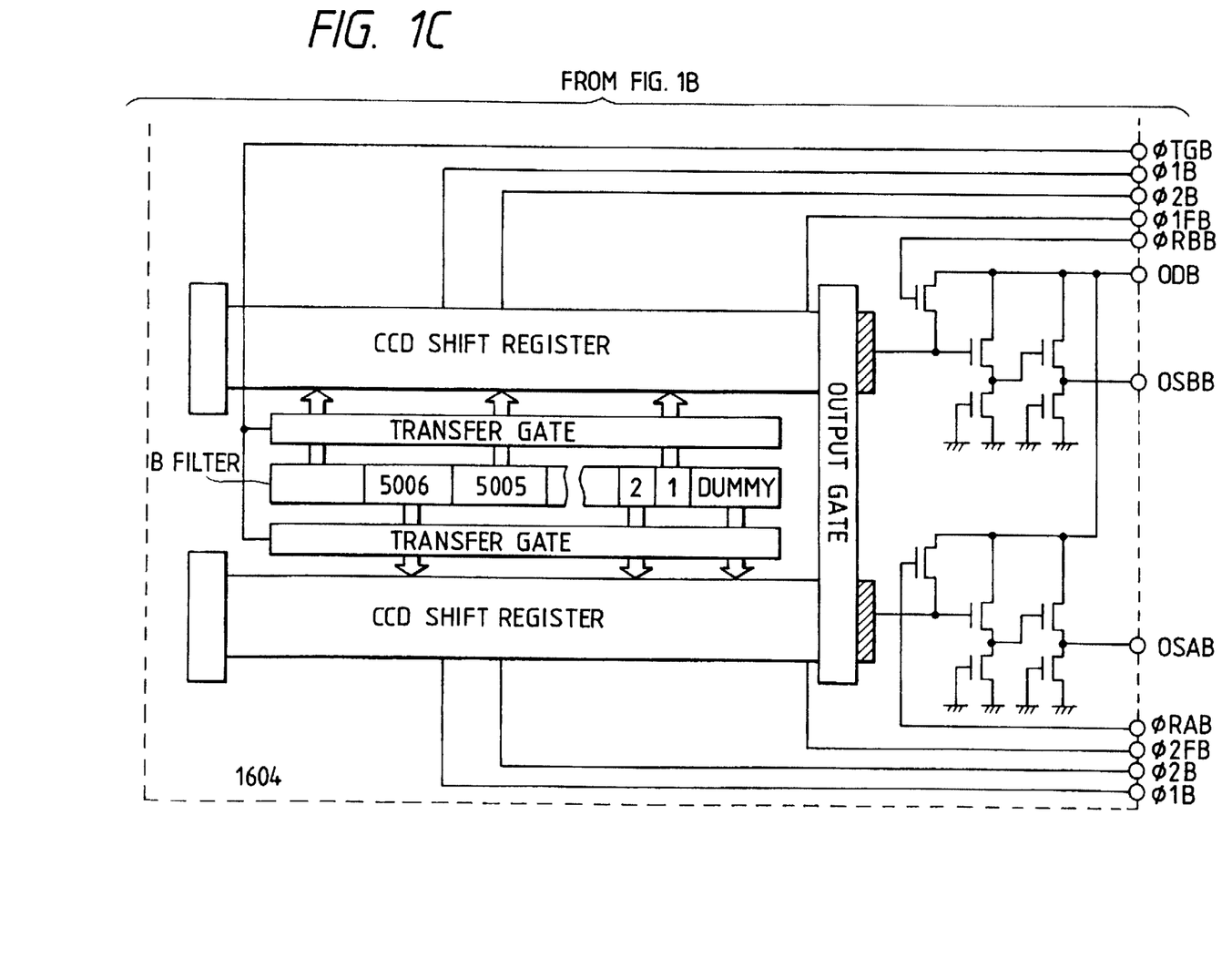

FIGS. 1A to 1C are views showing the arrangement of a conventional color CCD linear image sensor of the on-chip color filter system.

A color CCD linear image sensor 1601 of this prior art is a three-line color CCD linear image sensor which has three CCD (Charge-Coupled Device) chips, e.g., CCD image sensors (chips) 1602 to 1604 with R, G, and B on-wafer color filters arranged in parallel on the same wafer, as shown in FIGS. 1A to 1C.

Referring to FIG. 1A, a light-receiving unit 161 for performing photoelectric conversion in accordance with an incident light amount (reference numerals are added to only R, and G and B also have the same arrangement). On the CCD sensor elements of the light-receiving unit 161, a corresponding one of the R, G, and B color separation filters is arranged on the wafer. A light shield pixel unit is formed at the head portion of the light-receiving unit 161 so as to shield incident light by an aluminum mask arranged on the light-receiving unit 161 and always obtain an output in a dark state. Transfer gates 162 and 163 transfer charges accumulated in the light-receiving unit 161 to CCD shift registers 164 and 165 in accordance with a shift gate pulse $\phi_{TG}$. Charges accumulated in the even-numbered pixels of the light-receiving unit 161 are transferred to the CCD shift register 165 for the even-numbered pixels through the transfer gate 163. On the other hand, changes accumulated in the odd-numbered pixels of the light-receiving unit 161 are transferred to the CCD shift register 164 for the odd-numbered pixels through the transfer gate 162.

The CCD shift registers 164 and 165 perform CCD-transfer (perfect transfer) of the charges sent from the light-receiving unit 161 to output units and are driven by drive clocks $\phi_1$ ($\phi_{1R}$, $\phi_{1FR}$, $\phi_{1G}$, $\phi_{1FG}$, $\phi_{1B}$, and $\phi_{1FB}$) and $\phi_2$ ($\phi_{2R}$, $\phi_{2FR}$, $\phi_{2G}$, $\phi_{2FG}$, $\phi_{2B}$, and $\phi_{2FB}$) in two phases.

An output gate 166 sends the charges from the CCD shift registers 164 and 165 to output capacitor units 167a and 167b. The output capacitor units 167a and 167b convert the transferred charges into a voltage. Two source follower amplifiers 168a and 168b reduce the output impedance, thereby preventing noise from mixing in an output signal.

The output capacitor units 167a and 167b and the source follower amplifiers 168a and 168b constitute an FDA (Floating Diffusion Amplifier).

The color image sensor includes signal output terminals OSAR, OSBR, OSAG, OSBG, OSAB, and OSBB, reset pulse terminals $\phi$RAR, $\phi$RBR, $\phi$RAG, $\phi$RBG, $\phi$RAB, and $\phi$RBB, CCD shift register clock terminals $\phi$1R, $\phi$1G, $\phi$1B, $\phi$2R, $\phi$2G, and $\phi$2B, transfer gate clock terminals $\phi$TGR, $\phi$TGG, and $\phi$TGB, and source follower amplifier drain terminals ODR, ODG, and ODB.

In the color image sensor 1601 having the above arrangement, light incident on the light-receiving unit 161 is converted into charges proportional to the light amount. The charges of the even- and odd-numbered pixels are respectively transferred to the CCD shift registers 165 and 164 in accordance with the shift gate pulse $\phi_{TG}$. Thereafter, charges are output bit by bit to the FDA via the output gate 166 in accordance with the drive clocks $\phi1$ and $\phi2$. The charge output is converted into a voltage by the output capacitor units 167a and 167b of the FDA and output through the two source follower amplifiers 168a and 168b and the output terminals OSA and OSB.

Figure 2:
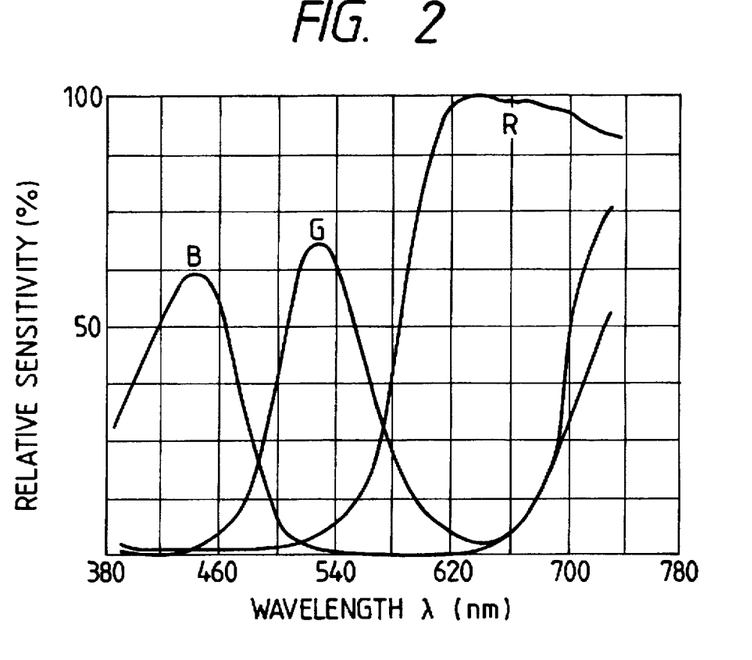
FIG. 2 is a graph showing the spectral transmission characteristics of the color filters of the color linear image sensor.
Figure 3:
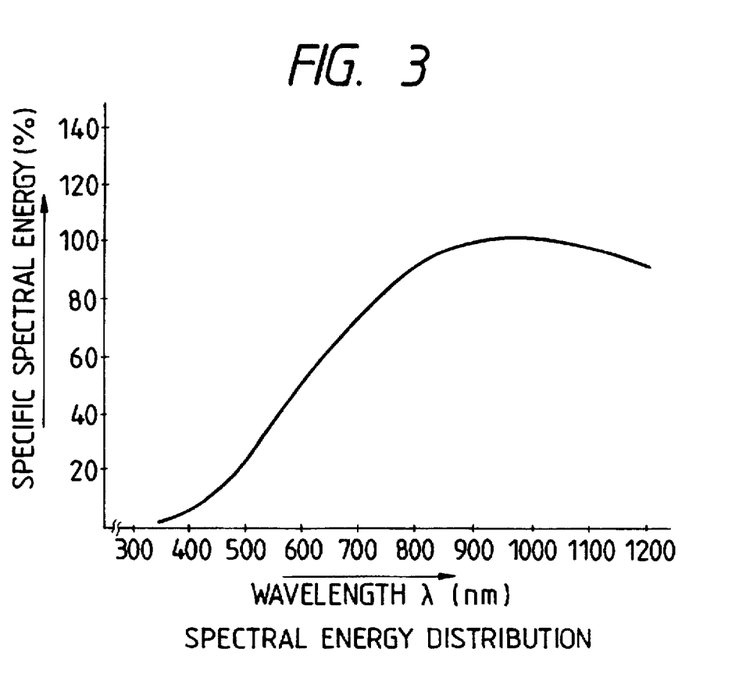
FIG. 3 is a graph showing the spectral energy distribution characteristics of a light source.
Figure 4:
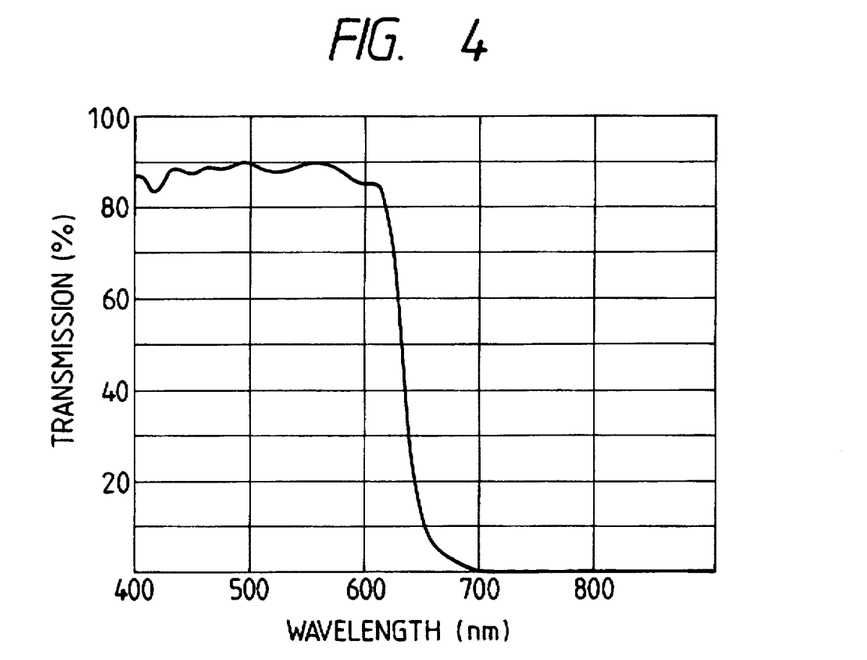
FIG. 4 is a graph showing the spectral transmission characteristics of an infrared absorbing filter.
Figure 5:
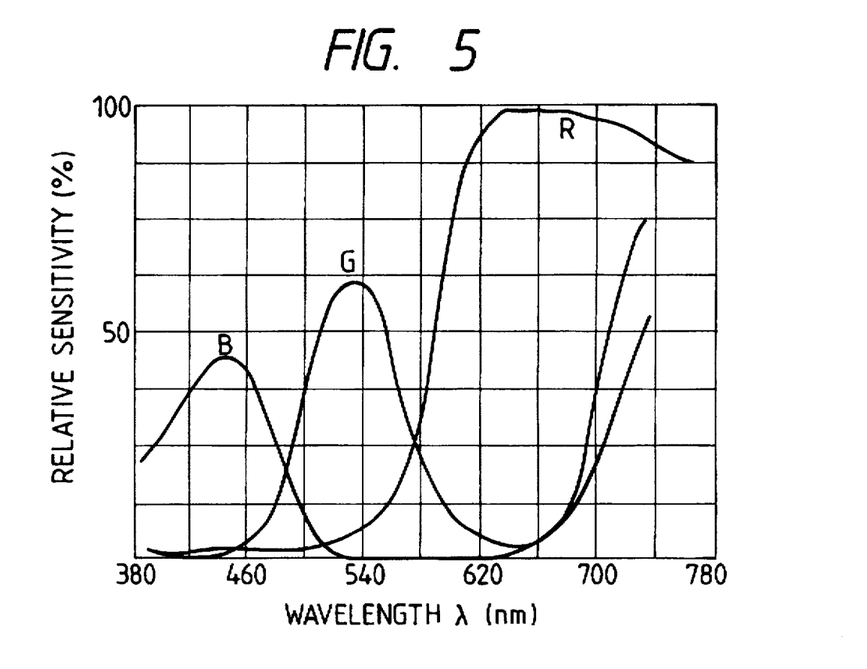
FIG. 5 is a graph showing the overall spectral characteristics of the color linear image sensor.

In this prior art, however, spectral characteristics as shown in FIG. 5 are obtained from the spectral transmissions of the R, G, and B color filters shown in FIG. 2, the spectral energy distribution of the light source shown in FIG. 3, and the spectral transmission of the infrared absorbing filter shown in FIG. 4. Charge amounts generated from the photodiodes of the CCDs 1602 to 1604 hold a relation B-CCD<R-CCD<G-CCD. The sensitivities of the CCDs 1602 to 1604 similarly satisfy B-CCD<R-CCD<G-CCD. For example, the sensitivities of the R, G, and B CCDs are R: 2.1 V/lx.sec, G: 2.6 V/lx.sec, and B: 0.86 V/lx.sec, respectively.

The saturation output voltages of the CCDs 1602 to 1604 are equal to each other because the CCD registers 164 and 165 normally have the same size.

When this three-line color CCD linear sensor is to be actually used, the arrangement of the reading system is determined depending on the light amount necessary for obtaining an output voltage for a desired S/N ratio.

That is, the arrangement is determined by the light amount with which the B-CCD 1604 having the lowest sensitivity outputs a voltage necessary for obtaining a desired S/N ratio. If the desired S/N ratio is 48 dB (256 levels), and the noise level from the CCD is 1 mV, the minimum output voltage is 256 mV.

When the output voltage from the B-CCD is 256 mV, the output voltages from the R-CCD 1602 and the G-CCD 1603 are respectively given as follows:

2.1(V/lx.sec)/0.86(V/lx.sec)×256 mV<625 mV, and 2.6(V/lx.sec)/0.86(V/lx.sec)×256 mV<774 mV Assume that the above output voltages are obtained for a certain accumulation time $T_1$ (μsec), and the reading speed of this image reading apparatus is to be increased. In this case, if the reading speed is to be doubled, an accumulation time $T_2$ is represented by $T_2=T_1/2$. The output voltages from the CCDs are B-CCD: 128 mV, R-CCD: 325 mV, and G-CCD: 383 mV. Therefore, an S/N ratio of 48 dB for the B-CCD 1604 cannot be obtained.

To prevent this, the light amount must be doubled. However, the light amount cannot simply be doubled because of the problem of an increase in temperature of the apparatus. To constitute the apparatus, the illumination light amount must be increased while preventing the problem of an increase in temperature. If the light amount cannot be sufficiently increased, the S/N ratio of the B-CCD must be decreased, resulting in degradation in image quality.

SUMMARY OF THE INVENTION

It is an object of the present invention to provide an image reading apparatus capable of reading an image with high quality.

It is another object of the present invention to provide an image sensor capable of reading an image at a sufficient signal level.

It is still another object of the present invention to provide a linear image sensor capable of reading an image with high quality at a sufficient signal level.

In order to achieve the above objects, according to one embodiment of the present invention, there is provided a linear image sensor constituted by forming a plurality of linear image sensors on a single wafer, each linear image sensor comprising a plurality of lines of photoelectric conversion means for converting light from an object into an electrical signal, a plurality of shift register means for transferring the electrical signal converted by the photoelectric conversion means to an output unit, and color filters which are formed on the photoelectric conversion means to color-separate the light from the object, comprising a plurality of first charge transfer means, arranged between the photoelectric conversion means, for synthesizing output signals from the plurality of lines of photoelectric conversion means and transferring the output signals from the photoelectric conversion means to the next photoelectric conversion means, a plurality of second charge transfer means, arranged between the plurality of shift register means, for transferring charges between the shift registers, and a signal terminal for changing a drive timing of a drive pulse for driving the first charge transfer means to switch a transfer direction of the first and second charge transfer means between a forward direction and a backward direction.

According to another embodiment of the present invention, there is provided a linear image sensor comprising a plurality of lines of photoelectric conversion means for converting light from an object into an electrical signal, charge transfer means for alternately transferring the electrical signal converted by the photoelectric conversion means between the photoelectric conversion means, and reversing means for reversing a transfer direction of the electrical signal between the photoelectric conversion means by the charge transfer means.

According to still another embodiment of the present invention, there is provided an image sensor comprising photoelectric conversion means, consisting of a plurality of pixels, for converting light from an object into an electrical signal, and first and second signal reading means arranged one on each side of the photoelectric conversion means, wherein the first and second signal reading means can read a signal of the same pixel of the photoelectric conversion means.

With this arrangement, degradation in image quality, which is caused by a decrease in S/N ratio due to a low level of an output signal from the photoelectric conversion means, can be prevented, thereby reading an image with high quality.

According to still another embodiment of the present invention, there is provided a color linear image sensor constituted by forming a plurality of linear image sensors on a single wafer, each linear image sensor comprising a plurality of lines of photoelectric conversion means for converting light from an object into an electrical signal, a plurality of shift register means for transferring the electrical signal converted by the photoelectric conversion means to an output unit, and color filters which are formed on the photoelectric conversion means to color-separate the light from the object, comprising a plurality of first charge transfer means, arranged between the photoelectric conversion means, for synthesizing output signals from the plurality of lines of photoelectric conversion means and transferring the output signals from the photoelectric conversion means to the next photoelectric conversion means, and a plurality of second charge transfer means, arranged between the plurality of shift register means, for transferring charges between the shift registers, wherein each of the plurality of shift register means is separated at a midpoint of the entire shift register, a transfer direction of the shift register is reversed at the midpoint, and when a drive timing of a drive pulse for driving the first charge transfer means is changed, the transfer direction of the first and second charge transfer means can be switched between a forward direction and a backward direction.

With this arrangement, an image can be read at high speed without increasing the line-to-line distance between the photoelectric conversion means.

BRIEF DESCRIPTION OF THE DRAWINGS

FIG. 1 is comprised of FIGS. 1A to 1C showing views illustrating the arrangement of a conventional color linear image sensor;

DETAILED DESCRIPTION OF THE PREFERRED EMBODIMENTS

Figure 6:
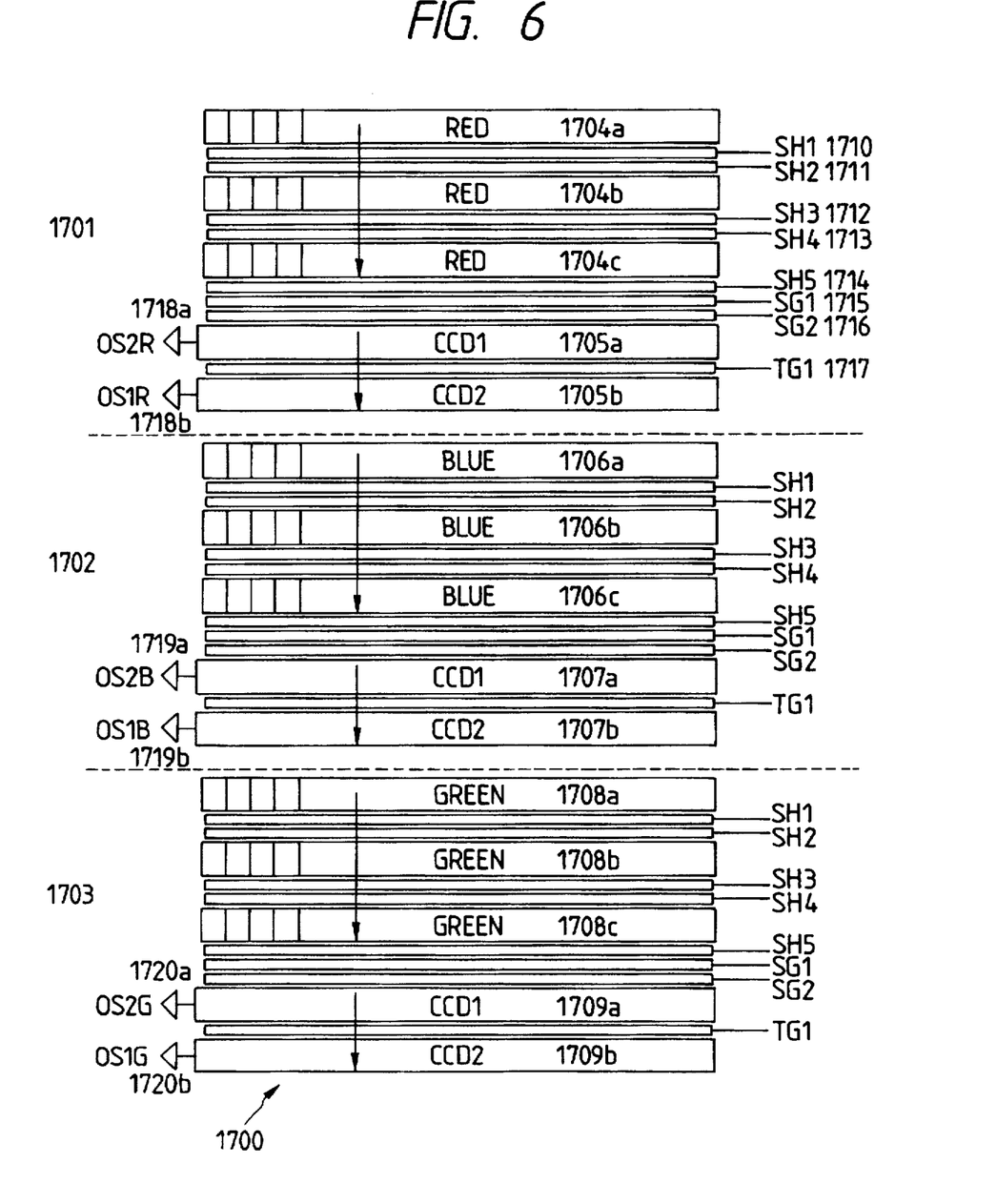
FIG. 6 is a view showing the arrangement of a color linear image sensor.

FIG. 6 is a view showing the arrangement of a linear image sensor of the Time Delay and Integration (TDI) system according to an embodiment of the present invention. In the TDI system, a plurality of lines of photoelectric conversion means are arranged in the linear image sensor. Output signals from the plurality of lines of photoelectric conversion means are sequentially synthesized with each other in synchronism with the reading speed of a scanner having the line sensor. With this operation, an output signal multiplied by the number of lines of the photoelectric conversion means of the line sensor can be obtained.

Referring to FIG. 6, a color CCD linear sensor 1700 allows the above-described TDI operation and has R, B, and G CCD linear sensor units 1701 to 1703.

Linear photodiode arrays 1704a to 1704c serve as photoelectric conversion means having R on-chip color filters. CCD shift registers 1705a and 1705b horizontally transfer charges generated in the linear photodiode arrays 1704a to 1704c to output units 1718a and 1718b. The two CCD shift registers 1705a and 1705b are arranged to improve the reading speed of the color CCD linear image sensor.

Similarly, linear photodiode arrays 1706a to 1706c and 1708a to 1708c have B and G on-chip color filters, respectively. The B CCD linear sensor unit 1702 includes B CCD shift registers 1707a and 1707b and B output units 1719a and 1719b, and the G CCD linear sensor unit 1703 includes G CCD shift registers 1709a and 1709b and G output units 1720a and 1720b.

Shift gates SH1 (1710) and SH3 (1712) temporarily accumulate the charges generated in the linear photodiode arrays in synchronism with the reading speed of the scanner. Shift gates SH2 (1711) and SH4 (1713) transfer the charges from the shift gates SH1 (1710) and SH3 (1712) to the linear photodiode arrays 1704b and 1704c, thereby synthesizing the charges accumulated in the shift gates SH1 (1710) and SH3 (1712) with charges generated in the next linear photodiode arrays 1704b and 1704c.

A shift gate SH5 (1714) transfers the charges generated in the linear photodiode 1704c to the CCD shift registers 1705a and 1705b in synchronism with the reading speed of the scanner. The charges are transferred from the linear photodiode array 1704c through the shift gates SH5 (1714), and charges for one pixel corresponding to shift gates SG1 (1715) and SG2 (1716) are sequentially transferred to the CCD shift registers 1705b and 1705a through the shift gates SG1 and SG2.

A transfer gate TG1 (1717) transfers the charges between the CCD shift registers 1705a and 1705b.

The B and G CCD linear sensor units 1702 and 1703 have the same arrangement as that of the R CCD linear sensor unit 1701, and a detailed description thereof will be omitted.

In the color CCD linear sensor 1700, integration of the charges and transfer of the charges between the CCDs and the shift registers are performed in only directions indicated by arrows, as described above.

Figure 7:
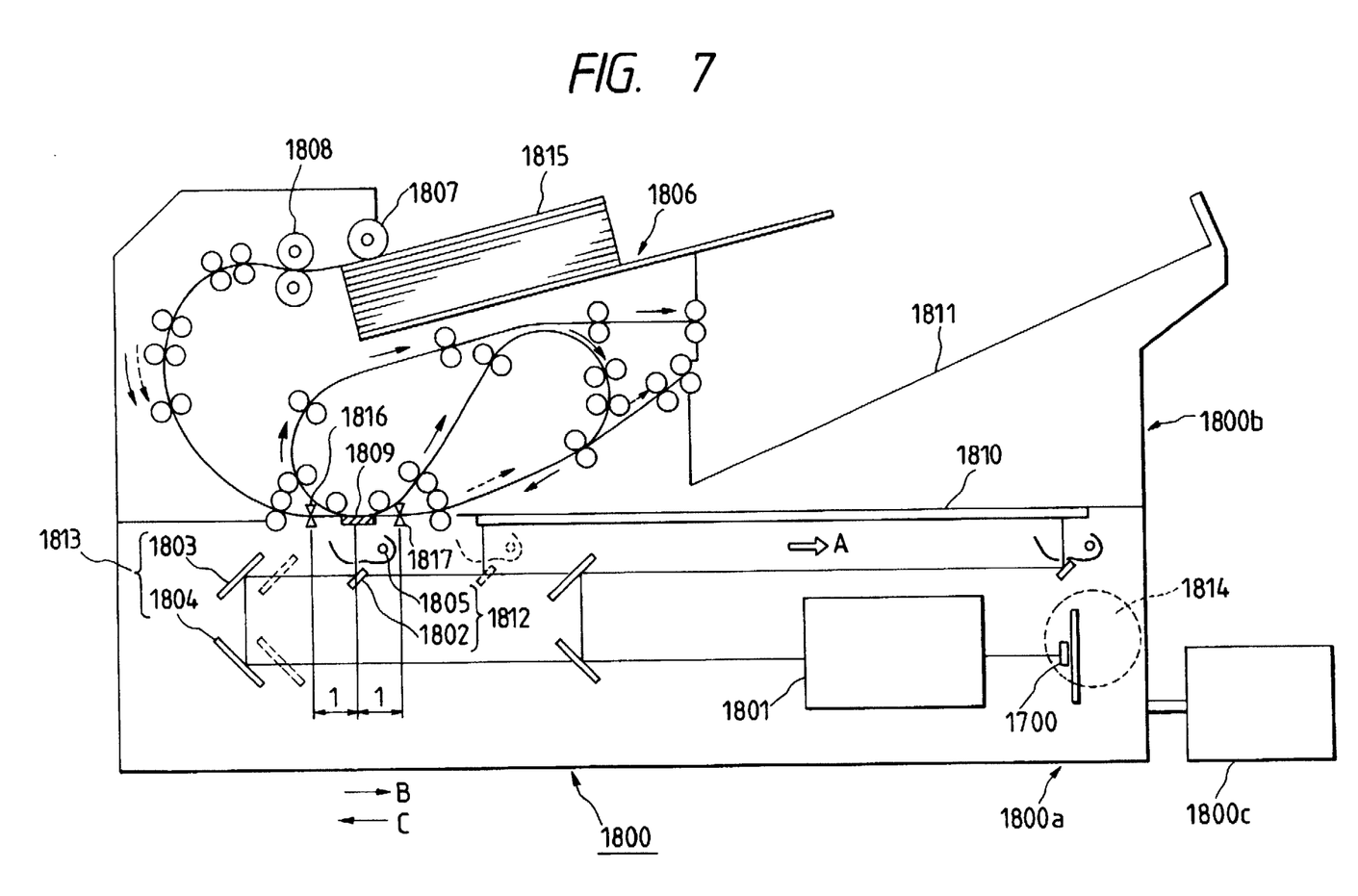
FIG. 7 is a sectional view showing the arrangement of an image reading apparatus of the present invention.

FIG. 7 is a sectional view showing the arrangement of a scanner 1800 having the color CCD linear sensor 1700 in FIG. 6.

The scanner 1800 has a scanner main body 1800a, a document feeder 1800b, and a control unit 1800c.

An original is mounted on a platen glass 1810. A mirror unit 1812 is constituted by a halogen lamp 1805 for exposing the original and a first reflecting mirror 1802.

A second reflecting mirror 1803 and a third reflecting mirror 1804 constitute a mirror unit 1813.

A lens unit 1801 reduces and focuses a reflected optical image from the original which is exposed and scanned by the halogen lamp 1805 on the color CCD linear sensor 1700. A read/feed platen glass 1809 is used when the original is to be fed/read using the document feeder 1800b.

If the mirror units 1812 and 1813 are moved by a stepping motor 1814 in a direction (sub-scanning direction) indicated by an arrow A at a scanning speed of 2:1 to read the original mounted on the platen glass 1810, the mirror units 1812 and 1813 start from positions indicated by broken lines.

The document feeder 1800b has the following constituent elements.

The document feeder 1800b has an original input tray 1806, an original pick-up roller 1807, feed rollers 1808 for feeding the original, and a discharge tray 1811.

In this case, an original is placed on the input tray 1806 with its surface facing up. In single-side original reading, the original is sent to the feed rollers by the pick-up roller 1807, fed by the feed rollers in accordance with the original reading timing, and conveyed in a direction indicated by a dotted arrow. When the original passes on the platen glass, a reflected optical image is reduced and focused on the color CCD linear sensor 1700 through the mirror units 1812 and 1813 and the lens unit 1801.

In two-side original reading, the original fed by the feed rollers is conveyed in a direction indicated by a solid arrow. First of all, the upper surface of the original passes the reading position of the feed/read platen glass and is read. Thereafter, the original is reverted along the conveyance route. The lower surface is read in a direction opposite to the reading direction in upper surface reading, and the original is discharged onto the discharge tray 1811 as in single-side original reading. The above series of operations are performed under control of the control unit 1800c.

At this time, the scanning direction of the image focused on the color CCD linear image sensor is a direction indicated by an arrow B in upper surface reading, or a direction indicated by an arrow C in lower surface reading. In the color CCD linear sensor 1700 in FIG. 6, integration for the TDI is performed in only one direction. For this reason, depending on the setting direction of the color CCD linear sensor 1700, only one of the upper and lower surfaces is read.

Figure 8:
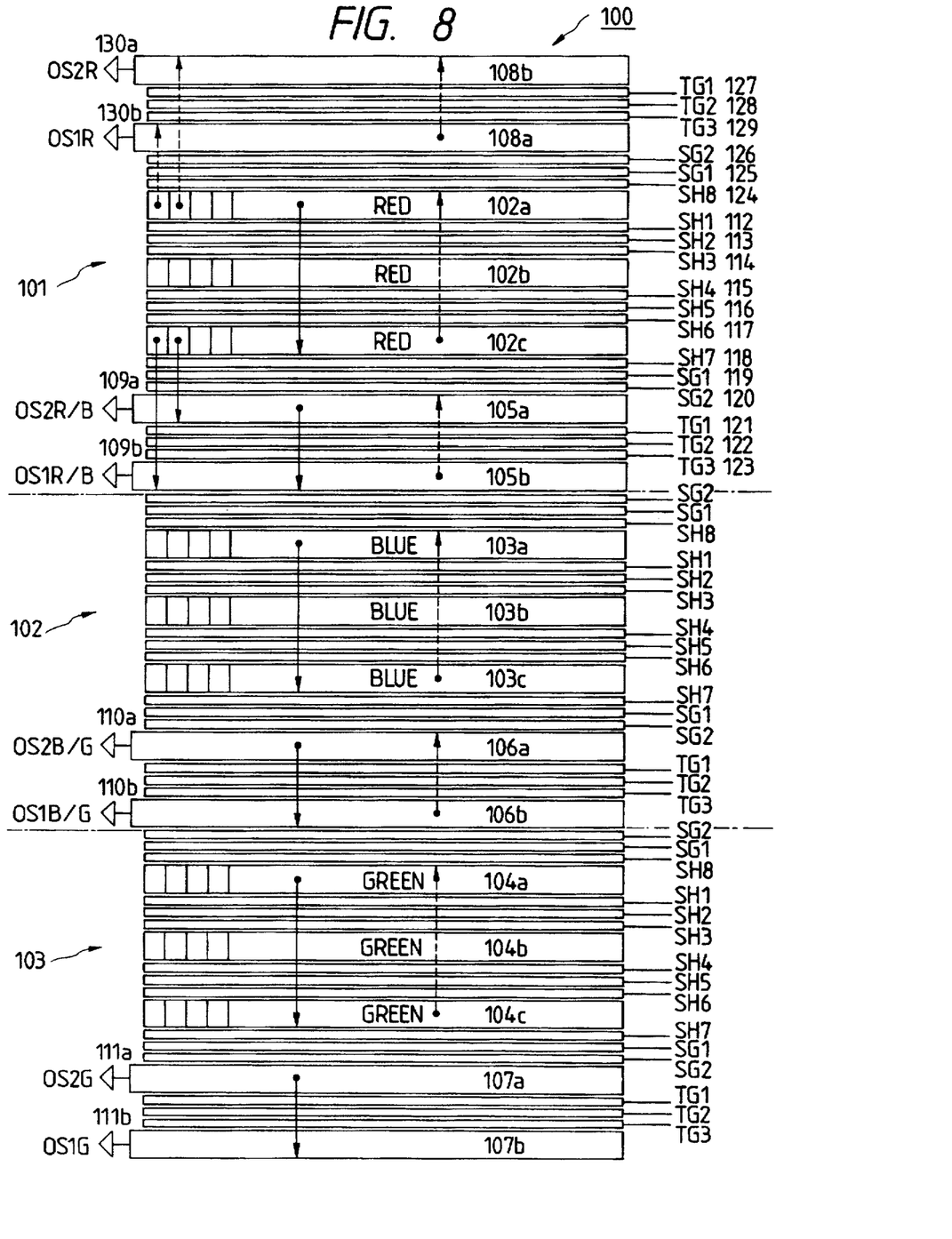
FIG. 8 is a view showing the arrangement of a color linear image sensor according to the first embodiment of the present invention.

To solve this problem, a linear image sensor as shown in FIG. 8 has been proposed.

A color CCD linear image sensor 100 of this embodiment is constituted by R, B, and G CCD linear sensor units 101 to 103.

Each of linear photodiode arrays 102a to 102c has an R on-chip color filter. Each of linear photodiode arrays 103a to 103c and 104a to 104c has a B or G on-chip color filter.

CCD shift registers 105a and 105b and 108a and 108b horizontally transfer charges generated in the linear photodiode arrays 102a to 102c to output units 109a and 109b and 130a and 130b, respectively. The CCD shift registers 105a and 105b are used in forward-direction (upper surface) reading (direction indicated by a solid arrow in FIG. 8), and the CCD shift registers 108a and 108b are used in backward-direction (lower surface) reading (direction indicated by a dotted arrow in FIG. 8).

The CCD shift registers 105a and 105b also serve as CCD shift registers (for B backward-direction reading) for horizontally transferring charges generated in the linear photodiode arrays 103a to 103c to the output units 109a and 109b.

CCD shift registers 106a and 106b transfer the charges generated in the B linear photodiode arrays 103a to 103c to output units 110a and 110b and are used in B forward-direction reading.

The CCD shift registers 106a and 106b also serve as CCD shift registers (for G backward-direction reading) for outputting the charges generated in the G linear photodiode arrays 104a to 104c.

CCD shift registers 107a and 107b horizontally transfer the charges generated in the G linear photodiode arrays 104a to 104c to output units 111a and 111b.

Shift gates SH1 (112), SH2 (113), and SH3 (114) transfer the charges generated in the linear photodiode array 102a to the next linear photodiode array 102b, and synthesize the charges with those generated in the linear photodiode array 102b. In forward-direction reading, the shift gates SH1 (112), SH2 (113), and SH3 (114) sequentially operate to transfer the charges in a direction indicated by a solid arrow.

In backward-direction reading, the shift gates SH1 to SH3 (112 to 114) operate in an order reverse to that in forward-direction reading.

That is, the shift gates operate in an order of SH3 (114)→SH2 (113)→SH1 (112). Shift gates SH4 (115), SH5 (116), and SH6 (117) transfer the charges in the vertical direction to synthesize the charges generated in the photodiode arrays 102b and 102c. The orders of operations in forward-direction reading and backward-direction reading are SH4→SH5→SH6 and SH6→SH5→SH4, respectively.

A shift gate SH7 (118) transfers the charges generated in the linear photodiode array 102c to the horizontal CCD shift registers 105a and 105b in synchronism with the reading speed of the scanner. Switch gates SG1 (119) and SG2 (120) sequentially transfer the charges in the linear photodiode array 102c, which are transferred by the shift gate SH7 (118), to the horizontal CCD shift registers 105a and 105b in correspondence with each pixel. The charges of the odd-numbered pixels are transferred to the horizontal CCD shift register 105b by the switch gate SG1 (119), and those of the even-numbered pixels are transferred to the horizontal CCD shift register 105a by the switch gate SG2 (120).

Transfer gates TG1 (121), TG2 (122), and TG3 (123) transfer the charges between the horizontal CCD shift registers 105a and 105b. As in the above-described transfer of the charges between the linear photodiodes, the order of the operations can be changed such as TG1→TG2→TG3 in forward-direction reading and TG3→TG2→TG1 in backward-direction reading. In this manner, the transfer direction can be switched between the forward direction and the backward direction (forward direction: solid arrow, backward direction: dotted arrow).

The horizontal CCD shift registers 105a and 105b are driven in two phases. As is normally known, two registers φ1 and φ2 are alternately arranged. When pulses are alternately input to the two registers, the potentials of the CCD registers change to sequentially transfer the charges in the directions of output units (109a and 109b). The above-described charges of charges between the registers through the transfer gates TG1 to TG3 is performed using the register φ1 of the two registers.

A shift gate SH8 (124) transfers the charges in the linear photodiode array 102a to the CCD shift registers 108a and 108b in synchronism with the reading speed of the scanner. Switch gates SG1 (125) and SG2 (126) sequentially transfer the charge in the shift gate SH8 to the CCD shift registers 108a and 108b in correspondence with each pixel. The charges of the odd-numbered pixels are transferred to the CCD shift register 108a by the switch gate SG1 (125), and those of the even-numbered pixels are transferred to the CCD shift register 108b by the switch gate SG2 (126).

Transfer gates TG1 (127), TG2 (128), and TG3 (129) transfer the charges between the CCD shift registers 108a and 108b. The operations are the same as those described above.

Figure 9A:
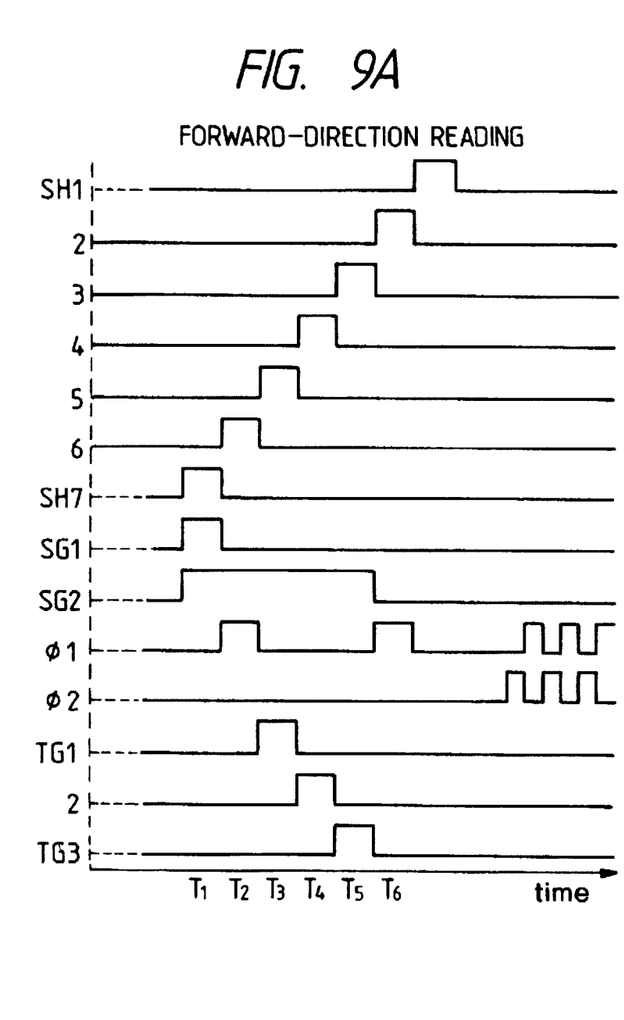
FIGS. 9A and 9B are timing charts of the color linear image sensor according to the embodiment of the present invention.
Figure 9B:
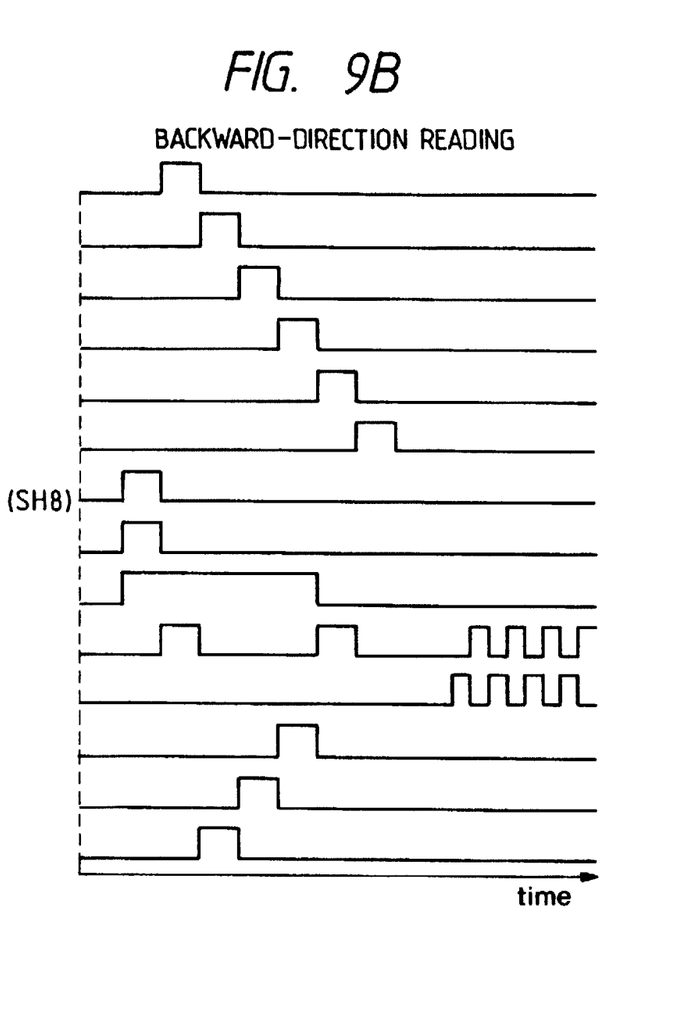

FIGS. 9A and 9B are timing charts of the color CCD linear image sensor 100 in FIG. 8.

In forward-direction reading shown in FIG. 9A, the shift gate SH7 and the switch gates SG1 and SG2 go high (to be abbreviated as "H" hereinafter) at timing $T_1$. The charges in the linear photodiode array 102c are transferred to the switch gates SG1 (119) and SG2 (120). At $T_2$, the switch gate SG1 at "H" goes low (to be abbreviated as "L" hereinafter), and the register φ1 at "L" goes "H", thereby transferring the charges in the switch gate SG1 (119) to the register φ1 of the CCD shift register 105a.

At $T_3$, the register φ1 at "H" goes "L", and the transfer gate TG1 goes "H", thereby transferring the charges from the register φ1 to the transfer gate TG1 (121).

Similarly, at $T_4$, the transfer gate TG1 at "H" goes "L", and the transfer gate TG2 at "L" goes "H". At $T_5$, the transfer gate TG2 at "H" goes "L", and the transfer gate TG3 at "L" goes "H", thereby sequentially transferring the charges through the transfer gates TG1 (121), TG2 (122), and TG3 (123).

At $T_6$, the switch gate SG2 (120) at "H" goes "L", and the register φ1 at "L" goes "H" again, thereby transferring the charges in the switch gate SG2 (120) to the register φ1 of the CCD shift register 105a. At the same time, the transfer gate TG3 (123) at "H" goes "L", thereby transferring the charges in the transfer gate TG3 (123) to the register φ1 of the CCD shift register 105b.

As shown in FIG. 9A, in transfer between the shift gates SH1 to SH7 related to the TDI operation, the charges are sequentially transferred one shift gate in one period. During the seventh period, the charges are transferred to the CCD shift registers 105a and 105b and read as an output.

In backward-direction transfer shown in FIG. 9B, the shift gate SH8 (124) operates in place of the shift gate SH7 (118), and the operation timings of the shift gates SH1 to SH6 (112 to 117) and the transfer gates TG1 to TG3 (121 to 123) are reversed to that in forward-direction transfer shown in FIG. 9A. Except for that, the operation is the same as that in forward-direction transfer.

The R CCD linear image sensor unit 101 of the color CCD linear image sensor 100 has been described above. In the B and G CCD linear image sensor units 102 and 103, the operations of constituent elements with the same reference symbols are the same, and a detailed description thereof will be omitted.

As described above, in this embodiment, an output signal from the photoelectric conversion means of the linear image sensor can be transferred in both the forward and backward directions. With this arrangement, degradation in image quality, which is caused by a decrease in S/N ratio due to a low output signal level, can be prevented, thereby obtaining an image with high quality.

In addition, integration of the output signal can be performed in both the forward and backward directions. For this reason, when both the upper and lower surfaces of an original or the like are to be read using a document feeder, reading is facilitated although the scanning direction changes in upper surface reading and lower surface reading.

Furthermore, when the upper and lower surfaces of a plurality of originals are to be continuously read, reading can be performed in a short period of time.

Figure 10:
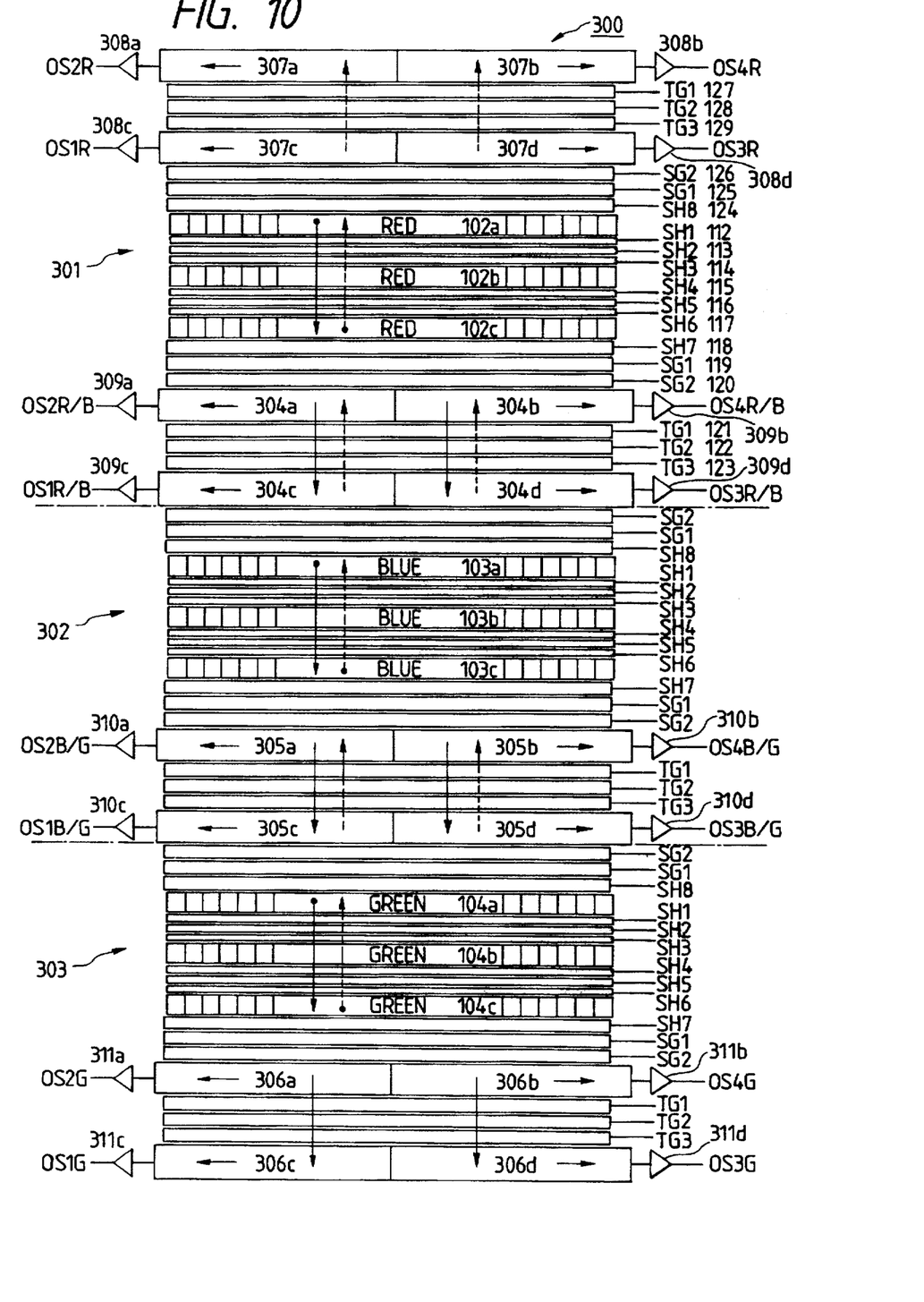
FIG. 10 is a view showing the arrangement of a color linear image sensor according to the second embodiment of the present invention.

FIG. 10 is a view showing the arrangement of a color CCD linear image sensor of an image reading apparatus according to the second embodiment of the present invention.

The same reference numerals or symbols as in FIG. 8 denote the same constituent elements in FIG. 10, and a detailed description thereof will be omitted.

A color CCD linear image sensor 300 used in the present invention is constituted by R, B, and G CCD linear sensor units 301 to 303.

Horizontal shift registers 304a to 304d transfer charges generated in R linear photodiode arrays 102a to 102c to output units 309a to 309d, respectively, in forward-direction reading. The horizontal CCD shift registers 304a to 304d transfer charges generated in B linear photodiode arrays 103a to 103c to the output units 309a to 309d, respectively, in backward-direction reading.

Similarly, horizontal CCD shift registers 305a to 305d transfer the charges generated in the B linear photodiode arrays 103a to 103c to output units 310a to 310d in forward-direction reading or the charges generated in G linear photodiode arrays 104a to 104c to the output units 310a to 310d in backward-direction reading. Horizontal CCD shift registers 306a to 306d transfer the charges generated in the G linear photodiode arrays 104a to 104d to output units 311a to 311d in forward-direction reading. Horizontal CCD shift registers 307a to 307d transfer the charges generated in the R linear photodiode arrays 102a to 102c to output units 308a to 308d in backward-direction reading.

Each of the horizontal CCD shift registers 304, 305, 306, and 307 has a four-line structure in which two lines extend in the horizontal direction, and each line is divided into two lines at the center. As for the transfer direction of the two CCD shift registers divided into two lines at the center, the reading direction is reversed from the center.

When the two horizontal CCD shift registers are arranged as in the color CCD linear image sensor in FIG. 8, the line-to-line distance between the linear photodiode arrays can be minimized (with four lines, the line-to-line distance is almost doubled). Additionally, when each line is divided into two lines, and the transfer direction is reversed, the same reading speed as in the four-line horizontal CCD shift registers which are horizontally arranged can be obtained (a reading speed twice that in the arrangement in FIG. 8 can be obtained).

The functions and operations of shift gates SH1 to SH8 (112 to 118 and 124), switch gates SG1 (119 and 125) and SG2 (120 and 126), transfer gates TG1 (121 and 127), TG2 (122 and 128), and TG3 (123 and 129) are the same as those in FIG. 8.

In the B and G CCD linear sensor units 302 and 303, the functions and operations of constituent elements with the same reference numerals or symbols as those in the R CCD linear sensor unit 301 are the same, and a detailed description thereof will be omitted.

The timing chart of this color CCD linear image sensor 300 is the same as that in FIGS. 9A and 9B because it has the same arrangement as that of the color CCD linear image sensor 100 in FIG. 8 except for the structure of the horizontal CCD shift register. Therefore, the above description is referred to as a detailed description.

With the above arrangement, the number of division of the shift registers is increased without increasing the line-to-line distance between the photoelectric conversion means, thereby increasing the image reading speed.

What is claimed is:

1. An image sensor constituted by forming a plurality of linear image sensors on a single wafer, each linear image sensor comprising a plurality of lines of photoelectric conversion means for converting light from an object into an electrical signal, and a plurality of shift register means for outputting the electrical signal converted by the plurality of photoelectric conversion means to an output unit, said image sensor comprising:

(a) a plurality of first charge transfer means, arranged between the lines of photoelectric conversion means, for synthesizing output signals from the plurality of lines of photoelectric conversion means and transferring the output signals from one of the lines of photoelectric conversion means to a next line of photoelectric conversion means;

(b) a plurality of second charge transfer means, arranged between the plurality of shift register means, for transferring charges between the shift register means; and (c) a signal terminal for changing a drive timing of said first and second charge transfer means to switch a transfer direction of said first and second charge transfer means between a forward direction and a backward direction.

2. A sensor according to claim 1, wherein said first charge transfer means has at least three lines.

3. A sensor according to claim 1, wherein said second charge transfer means has at least three lines.

4. A sensor according to claim 1, wherein the plurality of shift register means are arranged on each side of the plurality of lines of photoelectric conversion means.

5. A sensor according to claim 1, wherein the plurality of shift register means are arranged between the plurality of lines of photoelectric conversion means and commonly used by the photoelectric conversion means located on both the sides of the shift register means.

6. A sensor according to claim 1, wherein the shift register means is a CCD shift register.

7. A sensor according to claim 1, further comprising color filters formed on the photoelectric conversion means.

8. A sensor according to claim 7, wherein the color filters are primary color system filters for red, green, and blue.

9. An image sensor constituted by forming a plurality of linear image sensors on a single wafer, each linear image sensor comprising a plurality of lines of photoelectric conversion means for converting light from an object into an electrical signal, and a plurality of shift register means for outputting the electrical signal converted by the plurality of photoelectric conversion means to an output unit, said image sensor comprising:

a plurality of first charge transfer means, arranged between the lines of photoelectric conversion means, for synthesizing output signals from the plurality of lines conversion means to a next line of photoelectric conversion means; and a plurality of second charge transfer means, arranged between the plurality of shift register means, for transferring charges between the shift register means, wherein each of the plurality of shift register means is separated at its midpoint, a transfer direction of the shift register means is reversed at the midpoint, and when a drive timing of said first and second charge transfer means is changed, the transfer direction of said first and second charge transfer means can be switched between a forward direction and a backward direction.

10. A sensor according to claim 9, wherein at said first charge transfer means has at least three lines.

11. A sensor according to claim 9, wherein said second charge transfer means has at least three lines.

12. A sensor according to claim 9, wherein the plurality of shift register means are arranged on each side of the plurality of lines of photoelectric conversion means.

13. A sensor according to claim 9, wherein the plurality of shift register means are arranged between the plurality of lines of photoelectric conversion means and commonly used by the photoelectric conversion means located on both the sides of the shift register means.

14. A sensor according to claim 9, wherein the shift register means is a CCD shift register.

15. A sensor according to claim 9, further comprising color filters formed on the photoelectric conversion means.

16. A sensor according to claim 15, wherein the color filters are primary color system filters for red, green, and blue.

* * * * *

UNITED STATES PATENT AND TRADEMARK OFFICE
CERTIFICATE OF CORRECTION

PATENT NO.   : 5,784,101
DATED        : July 21, 1998
INVENTOR(S)  : SHIZUO HASEGAWA It is certified that error appears in the above-identified patent and that said Letters Patent is hereby corrected as shown below:

ON THE COVER PAGE AT [56], ATTORNEY, AGENT, OR FIRM

"Fitzpatrick,Cella," should read --Fizpatrick, Cella--.

COLUMN 1

Line 45, "changes" should read --charges--.

COLUMN 7

Line 39, "charges of" should read --transfers of--.

Signed and Sealed this

Twenty-fifth Day of May, 1999

Attest:

Q. TODD DICKINSON

Attesting Officer

Acting Commissioner of Patents and Trademarks